United States Patent
Uchiyama

(10) Patent No.: US 10,868,292 B2
(45) Date of Patent: Dec. 15, 2020

(54) METHOD FOR MANUFACTURING ACTIVE MATERIAL COMPOSITE POWDER

(71) Applicant: Toyota Jidosha Kabushiki Kaisha, Toyota (JP)

(72) Inventor: Takayuki Uchiyama, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 15/261,110

(22) Filed: Sep. 9, 2016

(65) Prior Publication Data
US 2017/0077489 A1    Mar. 16, 2017

(30) Foreign Application Priority Data
Sep. 14, 2015    (JP) .................... 2015-180392

(51) Int. Cl.
*H01M 4/00*    (2006.01)
*H01M 4/04*    (2006.01)
(Continued)

(52) U.S. Cl.
CPC .......... *H01M 4/0419* (2013.01); *C01G 33/00* (2013.01); *C01G 53/50* (2013.01); *H01M 4/0471* (2013.01);
(Continued)

(58) Field of Classification Search
CPC .... H01M 4/00; H01M 2004/00; H01M 10/00; C01G 53/00; C01G 33/00; B82Y 30/00; Y02T 10/00
See application file for complete search history.

(56) References Cited

U.S. PATENT DOCUMENTS

2003/0082448 A1*  5/2003  Cho ................. H01M 4/131
                                                 429/218.1
2004/0200998 A1   10/2004  Park et al.
(Continued)

FOREIGN PATENT DOCUMENTS

CN    103124695 A       5/2013
CN    104310479 A  *    1/2015
(Continued)

OTHER PUBLICATIONS

"Lithium Niobate crystal series (LiNbO3 , MgO:LiNbO3)", Laser Component, 2001.*
(Continued)

*Primary Examiner* — David P Turocy
*Assistant Examiner* — Mohammad Mayy
(74) *Attorney, Agent, or Firm* — Dinsmore & Shohl LLP

(57) ABSTRACT

Provided is a method for manufacturing an active material composite powder by which an active material composite powder that can inhibit increase in its reaction resistance at a high voltage state can be manufactured. The method includes: spraying a solution containing lithium and a peroxo complex of niobium to an active material, and at the same time drying the solution; carrying out a heating treatment, after the spraying and drying, for obtaining a powder including the active material and a coating layer attached to a surface of the active material; producing a mixed liquid by mixing the powder and a solvent that can dissolve lithium nitrate and does not dissolve lithium niobate included in the coating layer obtained by the heat treatment, and stirring the mixed liquid; and carrying out, after the mixing and stirring, a solid-liquid separation on the mixed liquid; and drying a solid obtained by the separation.

13 Claims, 7 Drawing Sheets

(51) Int. Cl.
  *H01M 4/36* (2006.01)
  *H01M 4/485* (2010.01)
  *C01G 53/00* (2006.01)
  *C01G 33/00* (2006.01)
  *H01M 4/525* (2010.01)
  *H01M 4/505* (2010.01)
  *H01M 10/0562* (2010.01)
  *H01M 10/052* (2010.01)

(52) U.S. Cl.
  CPC ........ *H01M 4/366* (2013.01); *H01M 4/485* (2013.01); *C01P 2004/84* (2013.01); *C01P 2006/12* (2013.01); *H01M 4/505* (2013.01); *H01M 4/525* (2013.01); *H01M 10/052* (2013.01); *H01M 10/0562* (2013.01); *H01M 2300/0068* (2013.01)

(56) References Cited

U.S. PATENT DOCUMENTS

| | | | |
|---|---|---|---|
| 2009/0081554 | A1 | 3/2009 | Takada et al. |
| 2009/0280412 | A1* | 11/2009 | Imanari .............. C01G 45/1228 429/221 |
| 2010/0068523 | A1* | 3/2010 | Williams .................... B01J 2/30 428/403 |
| 2010/0209771 | A1* | 8/2010 | Shizuka ................. B82Y 30/00 429/207 |
| 2011/0027661 | A1* | 2/2011 | Okazaki .............. H01M 4/1391 429/322 |
| 2013/0209890 | A1* | 8/2013 | Nagatomi .............. C01G 33/00 429/231.5 |
| 2014/0204445 | A1* | 7/2014 | Choi ...................... G02F 1/1523 359/275 |
| 2014/0227606 | A1* | 8/2014 | Suzuki ................. H01M 4/131 429/304 |
| 2014/0353547 | A1* | 12/2014 | Mitsumoto ............ C01G 53/50 252/182.1 |
| 2015/0194673 | A1* | 7/2015 | Takagi .................. H01M 4/505 429/223 |
| 2015/0311511 | A1* | 10/2015 | Okato ...................... H01M 4/52 429/223 |
| 2015/0333307 | A1 | 11/2015 | Thokchom et al. |
| 2016/0211519 | A1 | 7/2016 | Uchiyama et al. |

FOREIGN PATENT DOCUMENTS

| | | | | |
|---|---|---|---|---|
| JP | H06111822 | A | 4/1994 | |
| JP | 2009076402 | A | 4/2009 | |
| JP | 2010129190 | A | 6/2010 | |
| JP | 2011065887 | A | 3/2011 | |
| JP | 2012074240 | A | 4/2012 | |
| JP | 2012-156046 | A | 8/2012 | |
| JP | 2014-049310 | A * | 3/2014 | |
| JP | 2014049310 | A | 3/2014 | |
| JP | 2014093156 | A | 5/2014 | |
| JP | WO 2014080719 | A1 * | 5/2014 | ............. H01M 4/52 |
| JP | 2014238957 | A | 12/2014 | |
| JP | 2015056307 | A | 3/2015 | |
| JP | 2015-513768 | A | 5/2015 | |
| WO | 2007-004590 | A1 | 1/2007 | |
| WO | 2012043321 | A1 | 4/2012 | |
| WO | WO2015037330 | A1 * | 3/2015 | |

OTHER PUBLICATIONS

JP,2014-049310,A, English translated.*
CN 104310479 A, English translated.*
CN102139930A—Google Patents.*
WO2015037330, google translate (Year: 2015).*
Office Action dated Feb. 7, 2019, in U.S. Appl. No. 14/914,682, filed Feb. 26, 2016.
Office Action dated Feb. 16, 2018, in U.S. Appl. No. 14/914,682, filed Feb. 26, 2016.
Office Action dated Jul. 13, 2018, in U.S. Appl. No. 14/914,682, filed Feb. 26, 2016.
Dey, Deepa et al., "Peroxide route towards low temperature synthesis of LiNbO3: an environmentally benign approach", Journal of the Ceramic Society of Japan 112 (7), 2004, p. 368-372.
Advisory Office Action dated May 7, 2019, in U.S. Appl. No. 14/914,682, filed Feb. 26, 2016.
Notice of Allowance dated Jul. 15, 2019, in U.S. Appl. No. 14/914,682, filed Feb. 26, 2016.
Notice of Allowance dated Dec. 11, 2019 in U.S. Appl. No. 14/914,682, filed Feb. 26, 2016.

* cited by examiner

METHOD FOR MANUFACTURING ACTIVE MATERIAL COMPOSITE POWDER

TECHNICAL FIELD

The present disclosure relates to methods for manufacturing an active material composite powder including an active material and lithium niobate attached to at least part of the surface of the active material.

BACKGROUND

Metal ion secondary batteries (e.g. lithium ion secondary batteries, hereinafter also referred to as "all-solid-state batteries") have advantages, for example their systems for enduring safety may be easily simplified.

As a technique related to such all-solid-state batteries, for example, Patent Literature 1 (JP 2015-56307A) discloses a method for manufacturing an active material composite powder including spraying to an active material a solution containing lithium and a peroxo complex of niobium and at the same time drying the solution, and carrying out a heat treatment after spraying and drying, wherein the temperature of the heat treatment is higher than 123° C. and lower than 350° C. Patent Literature 2 (JP 2014-238957A) discloses a method for manufacturing a cathode active material powder consisting of a particle having a lithium niobate coating layer, the method including obtaining a slurry including a powder particle coated by a depositing material, by continuously adding an A liquid into a B liquid, wherein the A liquid is an aqueous solution in which a lithium compound and a niobium complex are dissolved, and the B liquid is a liquid in which powder particles of a cathode active material for lithium ion secondary batteries formed from a composite oxide including Li and transition metal M as its components is dispersed in a water-soluble organic solvent or a mixture of a water-soluble organic solvent and water, to progress a deposition reaction of the lithium compound and niobium complex provided from the A liquid onto the surface of the powder particle in the B liquid. Patent Literature 2 discloses ethanol as the water-soluble organic solvent.

Patent Literature 3 (JP 2014-49310A) discloses a method for producing a material for an active material including forming a coating layer constituted from lithium niobate onto the surface of an active material by using ethanol as a solvent of a solution for forming the lithium niobate coating layer, by means of a tumbling fluidized coating machine.

SUMMARY

Technical Problem

As a result of intensive research, the discloser of the present disclosure found that: in the lithium niobate layer on the surface of the active material composite powder manufactured by the method of Patent Literature 1, a trace of impurity which is considered as lithium nitrate is contained; and an all-solid-state battery including the active material composite powder and a sulfide solid electrolyte easily increases its reaction resistance after the battery is kept at a high voltage state (a state where the battery voltage is no less than 4.1 V vs. Li/Li$^+$. Hereinafter the same is applied). The mechanism of the increase in the reaction resistance has not been clarified, and the discloser presumes that the increase is due to the reaction of the impurity and the sulfide solid electrolyte. If the resistance reaction increases, the performance of the battery degrades easily. Therefore, inhibition of the increase in the reaction resistance is desired in view of inhibiting performance degradation at a high voltage state. However, in Patent Literatures 1 to 3, the effect on the reaction resistance by the impurity contained in the lithium niobate layer is not examined, and reducing the amount of the impurity is difficult. Therefore, it is difficult to inhibit the performance degradation at a high voltage state even with these techniques.

An object of the present disclosure is to provide a method for manufacturing an active material composite powder by which an active material composite powder that can inhibit the increase in the reaction resistance at a high voltage state can be made.

Solution to Problem

As a result of intensive research, the discloser of the present disclosure obtained an active material composite powder by mixing, with ethanol, an active material composite powder including an active material and a lithium niobate attached onto the surface of the active material, and stirring them, thereafter filtering the obtained material to separate the obtained material into a solid and a filtrate, and drying the separated solid. The discloser found that an all-solid-state battery including the active material composite powder obtained as above can inhibit the increase in its reaction resistance after the battery is kept at a high voltage state, compared to an all-solid-state battery including an active material powder obtained without mixing with ethanol. The present disclosure has been completed based on the above finding.

In order to solve the above problems, the present disclosure provides a method for manufacturing an active material composite powder, the method including: spraying a solution including lithium and a peroxo complex of niobium over an active material, and at the same time drying the solution; after the spraying and drying, carrying out a heat treatment, for obtaining a powder including the active material and a coating layer attached to a surface of the active material; after the heat treatment, mixing the powder and a solvent that can dissolve lithium nitrate and does not dissolve lithium niobate included in the coating layer obtained by the heat treatment, for producing a mixed liquid, and stirring the mixed liquid; after the mixing and stirring, carrying out a solid-liquid separation on the mixed liquid; and drying a solid obtained by the solid-liquid separation.

Here, "active material" in the present disclosure means a material which can be used as an electrode active material of all-solid-state batteries. "The solvent does not dissolve lithium niobate included in the coating layer obtained by the heat treatment" means that the amount of Nb is no more than the detection limit when an elemental analysis is carried out, for example by ICP emission spectrophotometry, on the mixed liquid in which the powder having the coating layer is mixed in a solvent.

By carrying out the spraying and drying and the heat treatment, it is possible to obtain a powder including an active material and a lithium niobate layer attached to the surface of the active material. By mixing and stirring the powder obtained as above and a solvent for mixed liquid, it is possible to dissolve at least part of the impurity contained in the lithium niobate layer in the solvent for mixed liquid. After that, by obtaining a powder by a solid-liquid separation, it is possible to inhibit the impurity dissolved in the solvent for mixed liquid from reattaching to the powder. Therefore it is possible to obtain a powder in which the amount of impurity contained in the lithium niobate layer is reduced. The reaction resistance of the all-solid-state battery including the active material composite powder manufactured by the above processes and a sulfide solid electrolyte is difficult to increase after the battery is kept at a high voltage state. Therefore, by having the above configuration, it is possible to provide a method for manufacturing an active material composite powder by which an active material composite powder that can inhibit the increase in the reaction resistance at a high voltage state can be manufactured.

In the present disclosure, a temperature of the heat treatment may be higher than 123° C. and lower than 350° C. By having such a configuration, reducing the reaction resistance is obtained.

In the present disclosure, the solvent (solvent for mixed liquid) that can dissolve lithium nitrate and does not dissolve lithium niobate included in the coating layer obtained by the heat treatment may be ethanol. By having ethanol as the solvent for mixed liquid, the manufacturing cost of the active material composite powder is reduced, in addition to the obtainment of the above effect.

According to the present disclosure, it is possible to provide a method for manufacturing an active material composite powder by which an active material composite powder that can inhibit increase in the reaction resistance at a high voltage state can be manufactured.

DESCRIPTION OF EMBODIMENTS

Hereinafter the present disclosure will be described with reference to the drawings. The embodiments shown below are examples of the present disclosure and the present disclosure is not limited to the embodiments.

1. Method for Manufacturing Active Material Composite Powder

Figure 1:
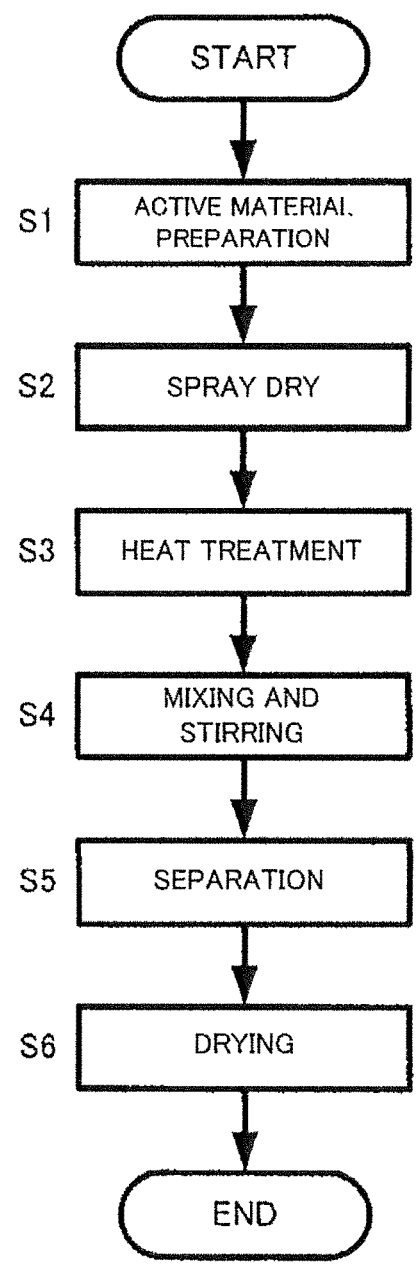
FIG. 1 is a view to explain a method for manufacturing an active material composite powder of the present disclosure.

FIG. 1 is a view to explain a method for manufacturing an active material composite powder of the present disclosure. The method for manufacturing an active material composite powder of the present disclosure shown in FIG. 1 includes an active material preparation step (S1), a spray dry step (S2), a heat treatment step (S3), a mixing and stirring step (S4), a separation step (S5), and a drying step (S6).

1.1. Active Material Preparation Step (S1)

The active material preparation step (hereinafter also referred to as "S1") is a step of preparing an active material on a surface of which lithium niobate is to be attached in the step described later. S1 is not particularly limited as long as an active material which can be used as an active material for electrodes of all-solid-state batteries can be prepared. In S1, the active material may be prepared by producing the active material, or may be prepared by purchase of the active material.

1.2. Spray Dry Step (S2)

Figure 2:
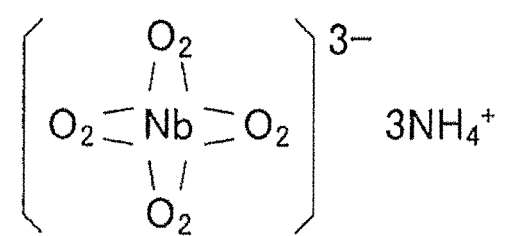
FIG. 2 is a view to explain a peroxo complex of niobium.

The spray dry step (hereinafter also referred to as "S2") is a step of spraying, over the active material prepared in S1, a solution including lithium and a peroxo complex of niobium, and at the same time drying the solution sprayed over the active material. FIG. 2 shows the constitutional formula of the peroxo complex of niobium. Examples of the solution to spray over the active material in S2 include an aqueous solution obtained by: producing a transparent solution including hydrogen peroxide, niobium acid, and ammonia water; and thereafter adding lithium salt into the obtained transparent solution (hereinafter the aqueous solution may be referred to as "complex solution"). Even if the moisture content of the niobium acid used in S2 changes, the peroxo complex of niobium can be synthesized. Therefore, the moisture content of the niobium acid is not particularly limited. As long as the peroxo complex of niobium can be synthesized, the mixing ratio of niobium acid and ammonia water is not particularly limited. Non-limiting examples of the lithium salt which can be used in S2 include LiOH, $LiNO_3$ and $Li_2SO_4$.

By the spraying in S2, the complex solution containing a niobium compound and a lithium compound is attached to the surface of the active material. Then, by the drying in S2, volatile components such as solvent and hydrated water contained in the complex solution attached to the surface of the active material are removed. Hereinafter the form obtained after the complex solution is dried may be referred to as "precursor of lithium niobate".

In S2, the complex solution is sprayed over the active material, and at the same time, the sprayed complex solution attached onto the surface of the active material is dried. S2 may be carried out by means of a tumbling fluidized coating machine, a spray drier, and the like. As the tumbling fluidized coating machine, Multiplex manufactured by POWREX CORPORATION, Flow Coater manufactured by FREUND CORPORATION, and the like may be given as examples. When a tumbling fluidized coating machine is used in S2 and one active material is focused on, the complex solution is dried immediately after being sprayed onto the active material, and thereafter, the spraying of the complex solution to the active material and drying of the sprayed complex solution on the active material are repeated, until the layer of the precursor of lithium niobate attached on the surface of the active material has a desirable thickness. When a tumbling fluidized coating machine is used in S2 and a plurality of active materials in the machine are focused on, active materials on which the complex solution is sprayed and active materials whose complex solution on the surface is dried are mixed. Therefore, S2 may be referred to as a step of spraying a complex solution over active materials and at the same time drying the complex solution attached on the active materials.

Here, hydrogen peroxide contained in the complex solution has a strong oxidizing action. Therefore, if the active material has contact with the complex solution for a long time, the active material is possibly eroded by the hydrogen peroxide, and the eroded active material deteriorates. Therefore, in the present disclosure, in order not to make the active material deteriorated, the complex solution existing on the surface of the active material is dried immediately after the complex solution is sprayed over the active material to be attached to the active material. By doing this, it is possible to manufacture an active material composite powder that can reduce the reaction resistance of a battery.

In addition, by attaching the precursor of lithium niobate onto the surface of the active material by S2 in which the complex solution is sprayed over the active material and at the same time the complex solution on the surface of the active material is dried, it is possible to form lithium niobate on the surface of the active material, even if the temperature of the heat treatment in the heat treatment step carried out after S2 is reduced. The effect obtained by the reduction of the temperature of the heat treatment will be described later.

1.3. Heat Treatment Step (S3)

The heat treatment step (hereinafter it may be referred to as "S3") is a step of producing a powder including the active material and a coating layer attached on the surface of the active material, by carrying out a heat treatment on the active material, on the surface of which the precursor of lithium niobate is attached. The heat treatment of S3 may be carried out in an air atmosphere.

In S3, the temperature of the heat treatment may be higher than 123° C. By carrying out the heat treatment at such a temperature, it is possible to reduce the remaining amount of impurities (volatile components) in the complex solution, such as solvent and hydrated water. Hydrated water prevents lithium ion conduction. Therefore, by reducing the remaining amount of the hydrated water, it is possible to reduce the reaction resistance. The active material composite powder manufactured by the method for manufacturing an active material composite powder of the present disclosure is used for all-solid-state batteries including sulfide solid electrolytes for example. Sulfide solid electrolytes deteriorate by the reaction with water, and as a result, the reaction resistance of the batteries easily increases. Therefore, by reducing the remaining amount of the solvent of the complex solution, it is possible to reduce the reaction resistance of the battery.

In S3, the temperature of the heat treatment may be less than 350° C. S3 is carried out after S2. Therefore, the precursor of lithium niobate is attached to the surface of the active material by S2 in which the complex solution is sprayed over the active material and at the same time the complex solution on the surface of the active material is dried. By S2 like this, the precursor of lithium niobate is attached on the surface of the active material, and it is possible to form lithium niobate even if the temperature of the heat treatment is lower than before. Here, if the temperature of the heat treatment is high, a lot of gaps are easily formed in the lithium niobate, and as a result, the BET specific surface area of the active material composite powder easily increases. These gaps, which inhibit lithium ion conduction, contribute to the increase in the reaction resistance of the battery. Reducing the number of gaps in the lithium niobate is effective to reduce the reaction resistance of the battery. To reduce the number of the gaps, it is effective to make the temperature of the heat treatment low. By making the temperature of the heat treatment less than 350° C., it is possible to reduce the number of gaps in the lithium niobate, therefore, it is possible to reduce the reaction resistance.

In addition, if the temperature of the heat treatment is no less than 350° C., crystallized lithium niobate is formed on the surface of the active material. The crystallized lithium niobate, whose lithium ion conductivity is lower than that of amorphous lithium niobate, contributes to the increase in the reaction resistance of the battery. In order to reduce the reaction resistance of the battery, it is effective not to crystallize the lithium niobate. In order not to crystallize the lithium niobate, it is effective to make the temperature of the heat treatment lower than a predetermined temperature. By making the temperature of the heat treatment less than 350° C., it is possible to prevent the crystallization of the lithium niobate, whereby it is possible to reduce the reaction resistance of the battery.

As described above, by forming lithium niobate on the surface of the active material by S3 in which a heat treatment is carried out after S2, it is possible to manufacture an active material composite powder that can reduce the reaction resistance of the battery. Alkoxide solutions used in a conventional technique have a lot of carbon, therefore gases are formed from the precursor of lithium niobate in a heat treatment. As a result, in a conventional technique, lithium niobate including a lot of gaps is easily formed. In contrast, according to the method for manufacturing an active material composite powder of the present disclosure using a solution containing a peroxo complex of niobium, it is possible to reduce the amount of the gas formed from the precursor of lithium niobate in the heat treatment. As a result, it is possible to reduce the number of gaps in the lithium niobate, whereby it is possible to reduce the reaction resistance. In addition, the complex solution used in the method for manufacturing an active material composite powder of the present disclosure is cheaper than alkoxide solutions. Therefore, in addition to the obtainment of the above effect, it is possible to reduce the manufacturing cost.

By manufacturing an active material composite powder via S1 to S3, it is possible to manufacture an active material composite powder whose BET specific surface area is more than 0.93 m$^2$/g and less than 1.44 m$^2$/g.

In the method for manufacturing an active material composite powder of the present disclosure, the temperature of the heat treatment in S3 may be higher than 123° C. and lower than 350° C. However, the upper limit of the temperature of the heat treatment may be no more than 300° C., in view of making it easy to reduce the reaction resistance of the battery by making it easy to reduce the number of the gaps in the lithium niobate and to prevent crystallization of the lithium niobate, etc. The temperature may be no more than 250° C. That is, the temperature T[° C.] of the heat treatment in S3 may be 123<T≤300, and may be 123<T≤250.

In the method for manufacturing an active material composite powder of the present disclosure, the lower limit of the temperature of the heat treatment may be no less than 150° C., in view of making it easy to reduce the reaction resistance of the battery by reducing the remaining amount of the impurities in the complex solution, such as solvent and hydrated water. That is, the temperature T[° C.] of the heat treatment in S3 may be 150≤T≤300, and may be 150≤T≤250.

1.4. Mixing and Stirring Step (S4)

The mixing and stirring step (hereinafter it may be referred to as "S4") is a step of, after S3, producing a mixed liquid by mixing the powder obtained by S1 to S3 and a solvent for mixed liquid, and stirring the mixed liquid. The powder obtained by S1 to S3 includes the active material and a lithium niobate layer attached on the surface of the active material. In the lithium niobate layer, contained is a trace of impurity which easily increases the reaction resistance of an all-solid-state battery kept at a high voltage state. According to the analysis from the present discloser, the impurity is presumed as lithium nitrate. The solvent for mixed liquid can dissolve lithium nitrate. Therefore, it is possible to dissolve at least part of the lithium nitrate contained in the lithium niobate layer, by mixing the powder obtained by S1 to S3 with the solvent for mixed liquid and stirring them. That is, S4 is a step for dissolving at least part of the lithium nitrate contained in the lithium niobate layer, in the solvent for mixed liquid.

In S4, ethanol may be used as the solvent used for dissolving at least part of the lithium nitrate contained in the lithium niobate layer, because ethanol is easily obtained, and it is easy to reduce the manufacturing cost by using ethanol, etc. S4 is a step carried out for dissolving, in the solvent, at least part of the lithium nitrate contained in the lithium niobate layer. Therefore, a solvent which is not ethanol may also be used instead of ethanol, as long as the solvent has the same effect as the effect described above, and as long as the solvent hardly dissolves lithium niobate. Examples of the solvent which can be used in S4 other than ethanol include acetone, liquid ammonia and the like.

In S4, the mixing ratio of the solvent for mixed liquid and the powder is not particularly limited. However, if the amount of the powder is too large, the viscosity of the mixed liquid gets excessively high, therefore the efficiency in S4 of dissolving lithium nitrate in the solvent easily degrades. On the other hand, if the amount of the solvent is too large, the cost easily increases. Considering these, the mixing ratio of the solvent for mixed liquid and the powder may be solvent for mixed liquid:powder=1:1 to 10:1 by mass ratio.

In S4, the temperature in the mixing and stirring is not particularly limited. However, if the temperature is increased, the solubility of lithium nitrate tends to increase. Therefore, the mixing and stirring may be carried out at a temperature higher than a room temperature, in view of making it easy to dissolve lithium nitrate in the solvent for mixed liquid in a short time. In the present disclosure, the mixing and stirring may be carried out in an environment at 20° C. to 60° C.

In S4, the stirring time is not particularly limited as long as it is possible to elute the lithium nitrate of the lithium niobium layer in the solvent for mixed liquid. In embodiments, it is possible to sufficiently remove lithium nitrate by carrying out the stirring at a room temperature for 30 minutes for example, and the effect tends to be saturated even if the stirring time is increased more.

1.5. Separation Step (S5)

The separation step (hereinafter it may be referred to as "S5") is a step of, after S4, carrying out a solid-liquid separation on the mixed liquid after the stirring is carried out thereto in S4. By carrying out a solid-liquid separation on the mixed liquid to separate the mixed liquid into a liquid in which lithium nitrate is dissolved and a powder, it is possible to reduce the amount of the lithium nitrate dissolved in the liquid to attach again to the powder, whereby it is possible to obtain a powder in which the content of lithium nitrate is reduced. In view of reducing the amount of the lithium nitrate dissolved in the liquid to attach again to the powder, S5 is a step of separating (carrying out a solid-liquid separation) the mixed liquid into a liquid and a solid, instead of evaporating the liquid and recovering the remaining powder. S5 may be, specifically, a step of separating the mixed liquid into a filtrate and a solid by filtering the mixed liquid.

1.6. Drying Step (S6)

Figure 3:
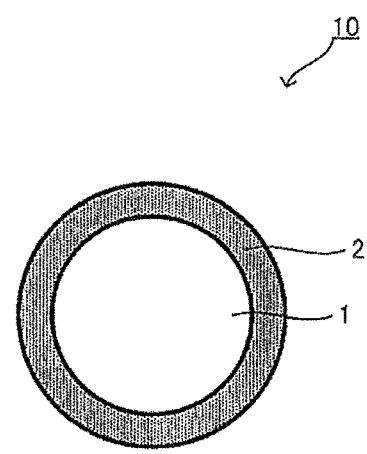
FIG. 3 is a view to explain an active material composite powder 10 manufactured by the present disclosure.

The drying step (hereinafter it may be referred to as "S6") is a step of drying the solid obtained in S5, to obtain an active material composite powder. S6 is not particularly limited as long as it is possible to remove the liquid attached to the solid obtained in S5, by drying the solid. S6 may be a step of drying the solid obtained in S5 under a reduced-pressure atmosphere for example. FIG. 3 shows an example of one embodiment of the active material composite powder manufactured via S1 to S6. The active material composite powder 10 shown in FIG. 3 includes an active material 1 and a lithium niobate layer 2 (also referred to as a coating layer 2) attached to the surface of the active material 1. The active material composite powder 10 is manufactured by S1 to S6. Therefore the amount of the lithium nitrate contained in the lithium niobate layer 2 is smaller than that of an active material composite powder manufactured without going through S4 to S6. As such, by using the active material composite powder 10, it is possible to obtain an all-solid-state battery that can inhibit the increase in its reaction resistance at a high voltage state.

2. Method for Manufacturing All-Solid-State Battery

Figure 4:
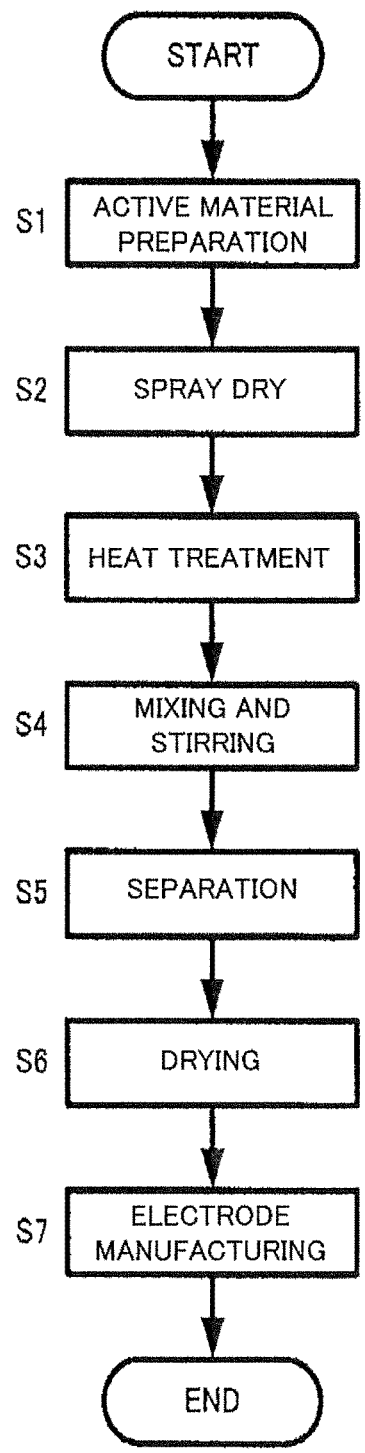
FIG. 4 is a view to explain a method for manufacturing an all-solid-state battery.

FIG. 4 is a view to explain a method for manufacturing an all-solid-state battery. In FIG. 4, steps S1-S6 are the same as steps S1-S6 shown in FIG. 1 explaining the method for manufacturing an active material composite powder of the present disclosure and the explanations thereof are not discussed in detail here.

The method for manufacturing an all-solid-state battery shown in FIG. 4 includes an active material preparation step (S1), a spray dry step (S2), a heat treatment step (S3), a mixing and stirring step (S4), a separation step (S5), a drying step (S6), and an electrode manufacturing step (S7). S1 to S6 are already explained in the above section "1. Method for Manufacturing Active Material Composite Powder", therefore the explanations thereof are omitted here.

Figure 5:
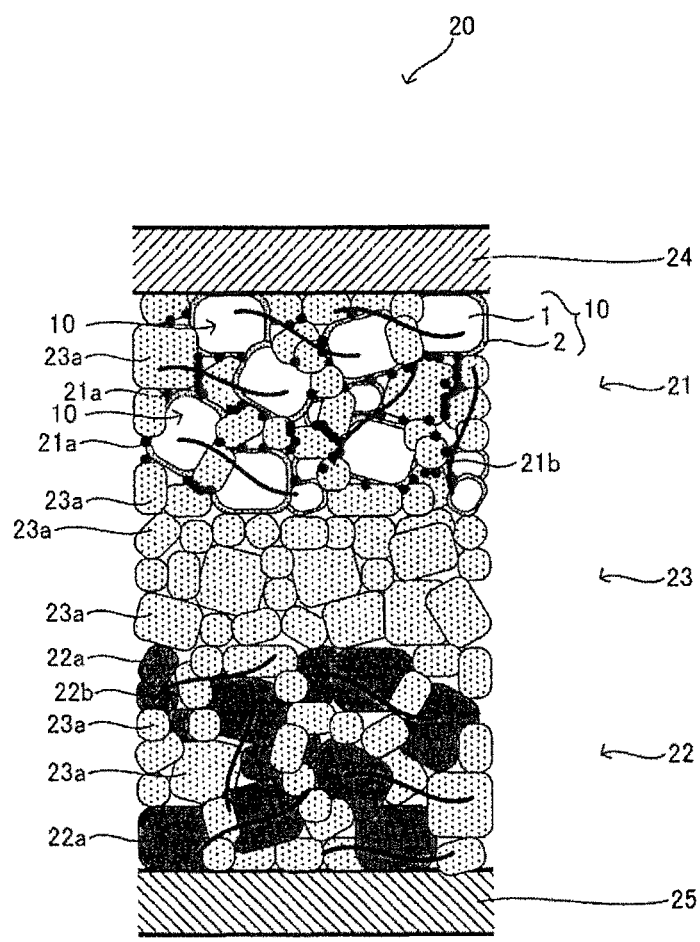
FIG. 5 is a view to explain an all-solid-state battery 20.

The electrode manufacturing step (hereinafter it may be referred to as "S7") is a step of manufacturing a cathode or an anode containing the active material composite powder manufactured by S1 to S6. For example, when the all-solid-state battery 20 shown in FIG. 5 is manufactured, S7 is a step of making a cathode 21 including the active material composite powder 10. S7 is not particularly limited as long as it is a step of manufacturing a cathode or an anode including the active material composite powder of the present disclosure. For example, when the cathode 21 is manufactured in S7, it may be a step of: putting, in a solvent, the active material composite powder 10, a sulfide solid electrolyte 23a, a conductive assistant 21a, and a binder 21b; thereafter dispersing the obtained material by an ultrasonic homogenizer and the like, to produce a cathode composition in a slurry form; followed by applying the cathode composition in a slurry form onto the surface of a cathode current collector 24; and thereafter drying it. In this manner, the cathode 21 may be manufactured.

After one electrode (cathode or anode) including the active material composite powder of the present disclosure is manufactured by S7, another electrode (anode or cathode, for example, an anode 22 connected to an anode current collector 25) to place an electrolyte between one electrode and another electrode, is manufactured. More specifically, the anode 22 may be manufactured by: putting the anode active material 22a, the sulfide solid electrolyte 23a, and binder 22b into a solvent; dispersing them by an ultrasonic homogenizer and the like, to make an anode composition in a slurry form; applying the anode composition in a slurry form on the surface of the anode current collector 25; and thereafter drying it. After one pair of electrodes (cathode and anode) is manufactured, the solid electrolyte layer 23 is manufactured by a process of pressing and the sulfide solid electrolyte 23a is arranged between the electrodes. Whereby, the all-solid-state battery 20 of the present disclosure may be manufactured. The all-solid-state battery 20 shown in FIG. 5 can be manufactured for example by a process of: layering the anode current collector 25, the anode 22, the solid electrolyte layer 23, the cathode 21, and the cathode current collector 24 in an inert gas atmosphere (for example, argon atmosphere, nitrogen atmosphere, helium atmosphere, and the like), in a manner that they are arranged from one side to the other side in the order mentioned; and pressing them. In the all-solid-state battery 20, the cathode active material 1 may be $LiNi_{1/3}Co_{1/3}Mn_{1/3}O_2$, and the anode active material 22a may be graphite.

As shown in FIG. 5, the all-solid-state battery 20 includes the cathode 21 containing the active material composite powder 10 of the present disclosure. As described above, the active material composite powder 10 of the present disclosure can inhibit the increase in the reaction resistance of the all-solid-state battery at a high voltage state. Therefore, by having the cathode 21 containing the active material composite powder 10, it is possible to provide the all-solid-state battery 20 that can inhibit the increase in the reaction resistance at a high voltage state.

In the all-solid-state battery including the active material composite powder 10, materials which can be used as electrode active materials of lithium ion secondary batteries can be used for the active material (including the active material 1) of the cathode and the anode. Examples of such materials include $LiCoO_2$, $NiCoO_2$, $LiNi_{1/3}Co_{1/3}Mn_{1/3}O_2$, $LiMnO_2$, different kinds of Li—Mn spinels ($LiMn_{1.5}Ni_{0.5}O_4$, $LiMn_{1.5}Al_{0.5}O_4$, $LiMn_{1.5}Mg_{0.5}O_4$, $LiMn_{1.5}Co_{0.5}O_4$, $LiMn_{1.5}Fe_{0.5}O_4$, $LiMn_{1.5}Zn_{0.5}O_4$), lithium titanate (e.g. $Li_4Ti_5O_{12}$) lithium metal phosphates ($LiFePO_4$, $LiMnPO_4$, $LiCoPO_4$, $LiNiPO_4$), transition metal oxides ($V_2O_5$, $MoO_3$), $TiS_2$, carbon materials such as graphite and hard carbon, LiCoN, $SiO_2$, $Li_2SiO_3$, $Li_4SiO_4$, lithium metal (Li), lithium alloys (LiSn, LiSi, LiAl, LiGe, LiSb, LiP), and lithium storable intermetallic compounds (e.g. $Mg_2Sn$, $Mg_2Ge$, $Mg_2Sb$, $Cu_3Sb$). Here, from the above-listed materials, two different substances having different electric potentials (charge-discharge potential) at which lithium ions are stored and discharged may be selected, and one of the materials that shows a generally noble potential can be used as the active material, and the other material that shows a less noble potential can be used as the anode active material, in the all-solid-state battery including the active material composite powder 10. This makes it possible to make an all-solid-state battery having any voltages.

In the all-solid-state battery including the active material composite powder 10, as described above, the cathode and the anode may also contain a solid electrolyte which can be used for lithium ion secondary batteries, as necessary. Examples of the solid electrolyte which can be contained in the cathode and the anode include $Li_2S$—$SiS_2$, LiI—$Li_2S$—$SiS_2$, LiI—$Li_2S$—$P_2S_5$, LiI—$Li_2O$—$Li_2S$—$P_2S_5$, LiI—$Li_2S$—$P_2O_5$, LiI—$Li_3PO_4$—$P_2S_5$, $Li_2S$—$P_2S_5$, and $Li_3PS_4$. The method for manufacturing the solid electrolyte that can be used for an all-solid-state battery including the active material composite powder 10 is not particularly limited, and solid electrolytes manufactured by any manufacturing method can be adequately used. The solid electrolyte may be amorphous or may be crystalline.

In the cathode, a known binder that can be contained in cathodes of lithium ion secondary batteries may be used. Examples of such a binder include acrylonitrilebutadiene rubber (ABR), butadiene rubber (BR), polyvinylidene fluoride (PVdF), and styrene-butadiene rubber (SBR). The cathode may further contain a conductive assistant which improves conductivity. Examples of the conductive assistant that can be contained in the cathode include carbon materials such as vapor grown carbon fiber, acetylene black (AB), Ketjen black (KB), carbon nanotube (CNT), and carbon nanofiber (CNF), and metal materials that can endure the using environment of lithium ion secondary batteries. If the cathode is manufactured of a cathode composition in a slurry form adjusted by the cathode active material, the solid electrolyte, the conductive assistant, the binder, and the like dispersed in a liquid, examples of the liquid which can be used include heptane and the like, and a non-polar solvent may be used. The thickness of the cathode may be in the range of from 0.1 μm to 1 mm, and may be in the range of from 1 μm to 100 μm. The cathode may be manufactured through a process of pressing. For an all-solid-state battery including the active material composite powder 10, the pressure in pressing the cathode may be approximately 100 MPa. The content of the cathode active material in the cathode may be, though not particularly limited, in the range of from 40% to 99% by mass %, for example.

For the anode, as necessary, a binder to bond anode active materials and solid electrolytes may be contained, in addition to the anode active materials and the solid electrolytes. As the binder, the above-described binders and the like that can be contained in the cathode may be given for example. The anode may further contain a conductive assistant which improves conductivity. As the conductive assistant that can be contained in the anode, the above-described conductive assistant that can be contained in the cathode may be given for example. When the anode is manufactured of an anode composition in a slurry form adjusted by the anode active material, the solid electrolyte, the conductive assistant, the binder, and the like dispersed in a liquid, for example heptane and the like may be given as the liquid that can be used, and a non-polar solvent may be used. The thickness of the anode may be in the range of from 0.1 μm to 1 mm, and may be in the range of from 1 μm to 100 μm for example. The anode may be manufactured through a process of pressing. For an all-solid-state battery including the active material composite powder 10, the pressure in pressing the anode may be no less than 200 MPa, and may be approximately 400 MPa. The content of the anode active material in the anode may be, though not particularly limited, in the range of from 40% to 99% by mass %, for example.

For the solid electrolyte to be contained in the solid electrolyte layer, solid electrolytes which can be used for all-solid-state batteries may be adequately used. As the solid electrolyte, the above-described solid electrolytes and the like that can be contained in the cathode and the anode may be given for example. In addition, the solid electrolyte layer may contain a binder for bonding solid electrolytes to each other, in view of developing plasticity etc. As the binder, the above-described binders that can be contained in the cathode may be given for example. The amount of the binder to be contained in the solid electrolyte layer may be no more than 5 mass %, in view of making it possible to form a solid electrolyte layer including the solid electrolyte prevented from excessively aggregating but evenly dispersed, for the purpose of easily providing high output power. When the solid electrolyte layer is manufactured through a process of: dispersing a solid electrolyte and the like in a liquid to adjust a solid electrolyte composition in a slurry form; and applying the composition in a slurry form to the base material, examples of the liquid to disperse the solid electrolyte and the like include heptane and the like, and a non-polar solvent may be used. The content of the solid electrolyte material in the solid electrolyte layer may be no less than 60%, may be no less than 70%, and may be no less than 80%, by mass %, for example. The thickness of the solid electrolyte layer may be, though greatly depending on the structure of the battery, in the range of from 0.1 μm to 1 mm, and may be in the range of from 1 μm to 100 μm.

For the anode current collector and the cathode current collector, known metal that can be used as current collectors of lithium ion secondary batteries may be used. Examples of the metal include a metal material including one or two or more elements selected from the group consisting of Cu, Ni, Al, V, Au, Pt, Mg, Fe, Ti, Co, Cr, Zn, Ge, and In.

The all-solid-state battery including the active material composite powder 10 may be used in a state being contained in a known exterior body which can be used for lithium ion secondary batteries, whose illustration is omitted. Examples of the exterior body include a known laminate film and a metal housing.

EXAMPLES

[Sample Making]

Example 1

(1) Preparation of Active Material

A cathode active material $LiNi_{1/3}Mn_{1/3}Co_{1/3}O_2$ (manufactured by NICHIA CORPORATION), on the surface of which lithium niobate was to be attached was prepared.

(2) Preparation of Complex Solution

In a container with 870.4 g of hydrogen peroxide of 30 mass % concentration, 987.4 g of ion exchange water and 44.2 g of niobium acid ($Nb_2O_5$-$3H_2O$ ($Nb_2O_5$ moisture content: 72%)) were added. Next, 87.9 g of ammonia water of 28 mass concentration was added in the container. The content of the container after the ammonia water was added thereto was sufficiently stirred, whereby a transparent solution was obtained. Further, 10.1 g of lithium hydroxide-monohydrate ($LiOH$—$H_2O$) was added to the obtained transparent solution, whereby a complex solution containing lithium and a peroxo complex of niobium was obtained. The mol concentrations of Li and Nb were each 0.12 mol/kg.

(3) Spray Dry

By means of a tumbling fluidized coating machine (MP-01, manufactured by POWREX CORPORATION), the complex solution in an amount of 2000 g obtained by the above-described steps was sprayed over 1000 g of cathode active material $LiNi_{1/3}Mn_{1/3}Co_{1/3}O_2$, and at the same time the complex solution was dried. Whereby, the surface of the cathode active material was coated by a layer including the precursor of lithium niobate. The operation conditions of the tumbling fluidized coating machine were intake gas: nitrogen, intake gas temperature: 120° C., intake gas flow amount: 0.4 m³/min, rotating speed of rotor: 400 rotations per minute, and spray speed: 4.5 g/min.

(4) Heat Treatment

A heat treatment was carried out under the conditions of 200° C. in air atmosphere for 5 hours, to the powder including the cathode active material and the layer formed on the surface of the cathode active material including the precursor of lithium niobate obtained by the spray dry. Whereby, a powder including $LiNi_{1/3}Mn_{1/3}Co_{1/3}O_2$ and lithium niobate attached on the surface of the $LiNi_{1/3}Mn_{1/3}Co_{1/3}O_2$ was obtained.

(5) Mixing and Stirring

The powder in an amount of 5 g after the heat treatment was put in 20 g of ethanol. The obtained material was stirred for 30 minutes at a room temperature by a stirrer, whereby a mixed liquid was obtained.

(6) Solid-liquid Separation

After stirred, the mixed liquid was filtered and separated into solid and filtrate.

(7) Drying

The solid obtained by the solid-liquid separation was dried at 120° C. for 10 hours by a vacuum drier (DP33, manufactured by YAMATO SCIENTIFIC CO., LTD.), whereby the active material composite powder of Example 1 was obtained.

(8) Making of All-solid-state Battery

The obtained active material composite powder of Example 1 and a sulfide solid electrolyte ($Li_3PS_4$) were weighed so that the active material composite powder:the sulfide solid electrolyte=6:4 by volume ratio, and added to a container with heptane in it. Further, a conductive assistant (vapor grown carbon fiber, manufactured by SHOWA DENKO K.K.) in an amount to be 3 mass % to the active material composite powder of Example 1, and a binder (butylene rubber, manufactured by JSR Corporation) in an amount to be 3 mass % to the active material composite powder of Example 1 were put in the container with heptane and the like in it. Whereby, a cathode slurry was manufactured. Next, the manufactured cathode slurry was dispersed by an ultrasonic homogenizer (UH-50, manufactured by MST Corporation. The same is applied hereinafter), whereby a cathode composition was made. The obtained cathode composition was applied on the upper surface of an aluminum foil, and dried at 100° C. for 30 minutes, whereby a cathode was formed on the upper surface of the aluminum foil. Next, the aluminum foil on which the cathode was formed on the upper surface was punched out into 1 cm² in size, whereby a cathode electrode was obtained.

On the other hand, an anode active material (layered carbon) and a sulfide solid electrolyte ($Li_3PS_4$) were weighed so that the anode active material:the sulfide solid electrolyte=6:4 by volume ratio, and put in a container with heptane in it. Further, a binder (butylene rubber, manufactured by JSR Corporation) in an amount to be 1.2 mass % to the anode active material was put in the container with the heptane, the anode active material and the like in it. Whereby an anode slurry was manufactured. Next, the manufactured anode slurry was dispersed by an ultrasonic homogenizer, whereby an anode composition was obtained. The obtained anode composition was applied on the upper surface of a copper foil, and dried at 100° for 30 minutes, whereby an anode was formed on the upper surface of the copper foil. Next, the copper foil on which the anode was formed on the upper surface was punched out into 1 cm² in size, whereby an anode electrode was obtained.

Next, a sulfide solid electrolyte ($Li_3PS_4$) in an amount of 64.8 mg was put in a tubular ceramics whose cross-sectional area of inner diameter was 1 cm². The surface of the electrolyte was smoothed and pressed at 98 MPa, whereby a separator layer was formed. Thereafter, the cathode electrode and the anode electrode were put in the tubular ceramics, so that the separator layer was arranged between the cathode electrode and the anode electrode, and pressed at 421.4 MPa for 1 minute. After that, a stainless bar was put in each of the cathode electrode side and the anode electrode side and restrained at 98 MPa. Whereby, an all-solid-state battery of Example 1 was manufactured.

Example 2

An active material composite powder (active material composite powder of Example 2) including $LiNi_{1/3}Mn_{1/3}Co_{1/3}O_2$ and lithium niobate attached to the surface of the LiNi$_{1/3}$Mn$_{1/3}$Co$_{1/3}$O$_2$ was manufactured in the same way as in Example 1, except that 5 g of the powder after the heat treatment was added to 20 g of ethanol, and thereafter the obtained material was stirred with a stirrer at a room temperature for 60 minutes, whereby a mixed liquid was obtained. Further, an all-solid-state battery (all-solid-state battery of Example 2) was manufactured in the same way as in Example 1, except that the active material composite powder of Example 2 was used instead of the active material composite powder of Example 1.

Comparative Example 1

An active material composite powder (active material composite powder of Comparative Example 1) including LiNi$_{1/3}$Mn$_{1/3}$Co$_{1/3}$O$_2$ and lithium niobate attached to the surface of the LiNi$_{1/3}$Mn$_{1/3}$Co$_{1/3}$O$_2$ was manufactured in the same way as in Example 1, except that the mixing and stirring, the solid-liquid separation, and the drying were not carried out after the heat treatment. Further, an all-solid-state battery (all-solid-state battery of Comparative Example 1) was manufactured in the same way as in Example 1, except that the active material composite powder of Comparative Example 1 was used instead of the active material composite powder of Example 1.

Comparative Example 2

An active material composite powder (active material composite powder of Comparative Example 2) including LiNi$_{1/3}$Mn$_{1/3}$Co$_{1/3}$O$_2$ and lithium niobate attached to the surface of the LiNi$_{1/3}$Mn$_{1/3}$Co$_{1/3}$O$_2$ was manufactured in the same way as in Example 1, except that 5 g of the powder after the heat treatment was added to 20 g of water, and stirred with a stirrer for 30 minutes at a room temperature, whereby a mixed liquid was obtained. Further, an all-solid-state battery (all-solid-state battery of Comparative Example 2) was manufactured in the same way as in Example 1, except that the active material composite powder of Comparative Example 2 was used instead of the active material composite powder of Example 1.

Comparative Example 3

An active material composite powder (active material composite powder of Comparative Example 3) including LiNi$_{1/3}$Mn$_{1/3}$Co$_{1/3}$O$_2$ and lithium niobate attached to the surface of the LiNi$_{1/3}$Co$_{1/3}$O$_2$ was manufactured in the same way as in Example 1, except that 5 g of the powder after the heat treatment was added to 20 g of water, and stirred with a stirrer for 60 minutes at a room temperature, whereby a mixed liquid was obtained. Further, an all-solid-state battery (all-solid-state battery of Comparative Example 3) was manufactured in the same way as in Example 1, except that the active material composite powder of Comparative Example 3 was used instead of the active material composite powder of Example 1.

[Element Analysis on Active Material Composite Powder]

To each of the active material composite powders of Examples 1 and 2, and Comparative Examples 1 to 3, quantitative analysis of nitrogen which was a structural element of lithium nitrate was carried out by an inert gas melting method. In addition, to each of the active material composite powders, quantitative analyses of lithium and niobium, which were structural elements of the lithium niobate layer, and lithium, nickel, cobalt, and manganese, which were structural elements of the active material were carried out by ICP emission spectrophotometry. TC-436AR (manufactured by LECO) was used for the analysis by the inert gas melting method, and an ICP emission spectrophotometer (ICPS-8000, manufactured by Shimadzu Corporation, the same is applied hereinafter) was used for the analysis by ICP emission spectrophotometry. The obtained results are shown in Table 1.

TABLE 1

| Sample | Washing solvent | Washing time [min] | Content [wt %] | | | | | |
|---|---|---|---|---|---|---|---|---|
| | | | N | Li | Nb | Ni | Co | Mn |
| Example 1 | ethanol | 30 | 0.050 | 7.39 | 1.97 | 18.2 | 18.1 | 17.2 |
| Example 2 | ethanol | 60 | 0.051 | 7.78 | 1.98 | 18.3 | 18.6 | 17.5 |
| Comparative Example 1 | none | none | 0.080 | 8.03 | 2.01 | 18.4 | 18.8 | 17.6 |
| Comparative Example 2 | water | 30 | 0.024 | 7.73 | 1.62 | 18.8 | 19.0 | 17.8 |
| Comparative Example 3 | water | 60 | 0.026 | 7.89 | 1.88 | 18.5 | 18.8 | 17.8 |

As shown in Table 1, compared to Comparative Example 1 in which washing was not carried out, each nitrogen content of Examples 1 and 2 in which washing with ethanol was carried out was reduced by approximately 35%, and each nitrogen content of Comparative Examples 2 and 3 in which washing with water was carried out was reduced by approximately 60%.

Compared to Comparative Example 1, each lithium content of Examples 1 and 2 and Comparative Examples 2 and 3 was slightly reduced. It was considered this was because lithium was eluted in the solvent.

Compared to Comparative Example 1, there was no significant change in the content of niobium in Examples 1 and 2, but each content of niobium in Comparative Examples 2 and 3 was reduced by approximately 5 to 20%. It was presumed this was because part of the lithium niobate layer was remained in a complex state and dissolved in water.

Compared to Comparative Example 1, there was no significant change regarding nickel, cobalt, and manganese.

[Element Analysis on Filtrate]

To each of the filtrates obtained by the solid-liquid separation in manufacturing the active material composite powders of Examples 1 and 2 and Comparative Examples 2 and 3, quantitative analysis of nitric acid ions was carried out by ion chromatography. To each of the filtrates, quantitative analyses of lithium and niobium, which were structural elements of the lithium niobate layer, and of lithium, nickel, cobalt, and manganese, which were structural elements of the active material were carried out. An ion chromatograph (ISC-1500, manufactured by Dionex) was used for the analysis by ion chromatography, and an ICP emission spectrophotometer was used for the analysis by ICP emission spectrophotometry. The obtained results are shown in Table 2.

TABLE 2

| Sample | Washing solvent | Washing time [min] | Concentration [μg/mL] | | | | | |
|---|---|---|---|---|---|---|---|---|
| | | | $NO_3^-$ | Li | Nb | Ni | Co | Mn |
| Example 1 | ethanol | 30 | 220 | 40 | <10 | <10 | <10 | <10 |
| Example 2 | ethanol | 60 | 260 | 50 | <10 | <10 | <10 | <10 |
| Comparative Example 2 | water | 30 | 510 | 350 | 600 | <10 | <10 | <10 |
| Comparative Example 3 | water | 60 | 550 | 390 | 830 | <10 | <10 | <10 |

As shown in Table 2, nitric acid ions were confirmed in all of the filtrates, and as the washing time increased, the amount of nitric acid ions included in each filtrate was increased. In comparing Examples 1 and 2 in which washing with ethanol was carried out and Comparative Examples 2 and 3 in which washing with water was carried out, each filtrate of Comparative Example 2 and 3 in which washing with water was carried out included more nitric acid ions. It was considered that the more nitric ions were included, the more reduced the nitrogen content of the active material composite powder was. Therefore, the result was conformed to the results of element analysis shown in Table 1.

In addition, as the washing time was increased, the amount of lithium contained in the filtrate was increased. In comparing Examples 1 and 2 in which washing with ethanol was carried out and Comparative Examples 2 and 3 in which washing with water was carried out, the amount of lithium contained in the latter filtrate (filtrate from washing with water) was approximately eight times larger than the amount of lithium contained in the former filtrate (filtrate from washing with ethanol). It was presumed this was because part of lithium contained in the active material and part of lithium contained in the lithium niobate layer were dissolved, in addition to the elution of lithium nitrate, in Comparative Examples 2 and 3 in which washing was carried out with water.

In addition, niobium was detected from the filtrates of Comparative Examples 2 and 3 in which washing was carried out with water, whereas the amount of niobium in the filtrates of Examples 1 and 2 in which washing was carried out with ethanol was less than the detection limit. It was considered that: niobium was detected from the filtrates of Comparative Examples 2 and 3 because lithium niobate was dissolved in water; and the amount of niobium in the filtrates of Comparative Examples 1 and 2 was less than the detection limit because lithium niobate was difficult to dissolve in ethanol.

In Examples 1 and 2, and Comparative Examples 2 and 3, the amounts of nickel, cobalt, and manganese were less than the detection limits.

From the above results, it was considered that the impurity removed by the washing by the mixing and stirring was lithium nitrate. It was considered that the lithium nitrate was generated by the same mechanism as Ostwald process, because hydrogen peroxide and ammonia were used in preparing the complex solution as described above.

[Measurement of Initial Reaction Resistance of All-solid-state Battery]

Each of the all-solid-state batteries of Examples 1 and 2, and Comparative Examples 1 to 3 manufactured by the above-described method was charged to 4.5 V in voltage and then discharged to 2.5 V. Thereafter, AC impedance measurement was carried out thereto at 3.6 V. In this measurement, an AC impedance measurement device (SI1260, manufactured by Solartron Metrology, the same is applied hereinafter) was used. From one circular arc obtained from Nyquist plot, the reaction resistance [$\omega \cdot cm^2$] of each all-solid-state battery was specified. The obtained results are shown in FIG. 6.

Figure 6:
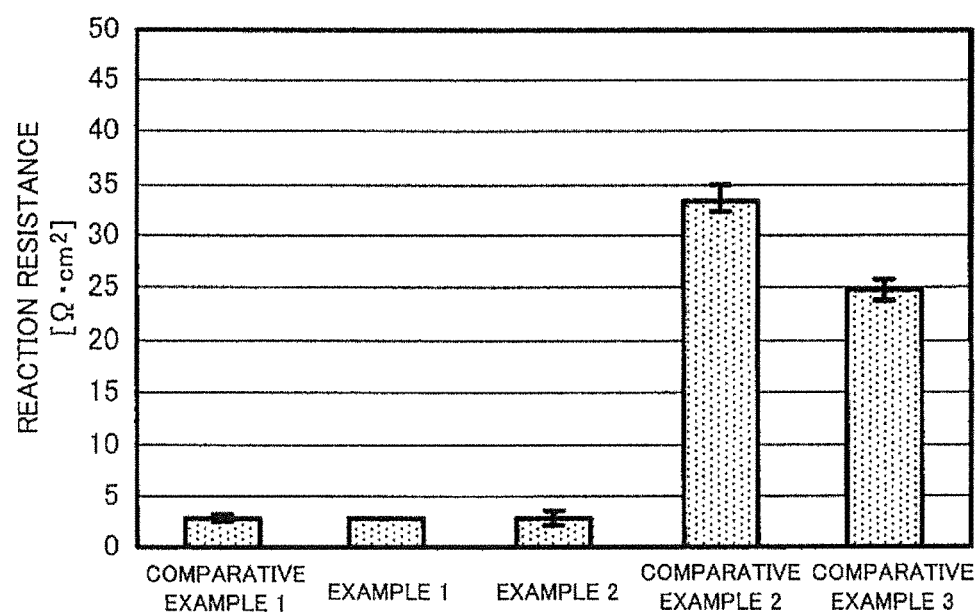
FIG. 6 is a graph to show the measurement results of reaction resistance before batteries are kept at a high voltage state.

As shown in FIG. 6, each all-solid-state battery of Examples 1 and 2, in which the composite active material particle washed with ethanol was used, had nearly the same initial reaction resistance as that of the all-solid-state battery of Comparative Example 1. However, each initial reaction resistance of all-solid-state batteries of Comparative Examples 2 and 3, in which the composite active material particle washed with water was used, was greatly increased compared to the initial reaction resistance of the all-solid-state batteries of Examples 1 and 2 and Comparative Example 1. It was considered this was because not only impurities but also the lithium niobate layer was eluted when the composite active material particle was washed with water. From the results, it was found that the reaction resistance increased if the active material washed with water was used.

[Measurement of Reaction Resistance of All-Solid-State Battery After the Battery is Kept at a High Voltage State]

Each all-solid-state battery of Examples 1 and 2 and Comparative Example 1, whose initial reaction resistance was low, was kept in a state that its battery voltage was 4.55 V at 60° C. for 200 hours. Thereafter an AC impedance measurement was carried out at 3.6V, whereby the reaction resistance after the battery was kept at a high voltage state was measured. In this measurement, an AC impedance measurement device was used. From one circular arc obtained from a Nyquist plot, the reaction resistance [$\omega \cdot cm^2$] of each all-solid-state battery was specified. By the obtained reaction resistance R1 and the above-described initial reaction resistance R2, the resistance increase rate [%] was calculated from the formula: Resistance increase rate R [%]=100×R1/R2. The results of the resistance increase rate [%] are shown in FIG. 7.

Figure 7:
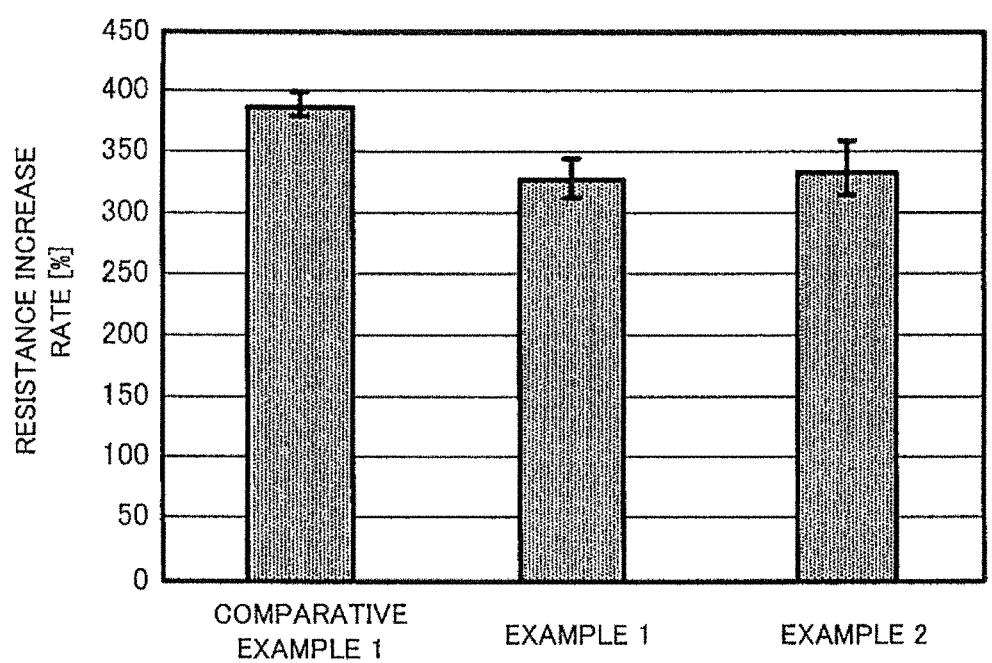
FIG. 7 is a graph to show the measurement results of reaction resistance after batteries are kept at a high voltage state.

As shown in FIG. 7, the all-solid-state batteries of Examples 1 and 2, in which the composite active material particles washed with ethanol were used, reduced their increase rates of reaction resistance, more than that of the all-solid-state battery of Comparative Example 1. It was considered this was because the impurity (lithium nitrate) contained in the lithium niobate layer was reduced.

From the above results, it was confirmed that, according to the present disclosure, it was possible to manufacture an active material composite powder that can inhibit the increase in its reaction resistance at a high voltage state.

DESCRIPTION OF REFERENCE NUMERALS 1 active material
2 lithium niobate
10 active material composite powder
20 all-solid-state battery
21 cathode
21a conductive assistant
21b, 22b binder
22 anode
22a anode active material
23 solid electrolyte layer (electrolyte)
23a sulfide solid electrolyte
24 cathode current collector
25 anode current collector

The invention claimed is:

1. A method for manufacturing an active material composite powder, the method comprising:
spraying a solution including lithium and a peroxo complex of niobium over an active material, and at the same time drying the solution;
after the spraying and drying, carrying out a heat treatment for obtaining a powder including the active material and a coating layer attached to a surface of the active material,
wherein the coating layer comprises lithium nitrate and lithium niobate,
wherein a temperature of the heating treatment is higher than 150° C. and no more than 250° C.;
after the heat treatment, mixing the powder and a solvent such that the solvent dissolves lithium nitrate from the coating layer and does not dissolve lithium niobate included in the coating layer obtained by the heat treatment to produce a mixed liquid, and stirring the mixed liquid, wherein a mixing ratio of the solvent to the powder in the mixed liquid is from 1:1 to 10:1 by mass;
after the mixing and stirring, carrying out a solid-liquid separation on the mixed liquid; and
drying a solid obtained by the solid-liquid separation.

2. The method for manufacturing an active material composite powder according to claim 1, wherein the solvent is selected from the group consisting of acetone, liquid ammonia, and ethanol.

3. The method for manufacturing an active material composite powder according to claim 2, wherein the solution including lithium and a peroxo complex of niobium is produced by producing a transparent solution by combining hydrogen peroxide water, niobium acid, and ammonia water, and thereafter adding lithium salt to the transparent solution.

4. The method for manufacturing an active material composite powder according to claim 1, wherein the solvent is ethanol.

5. The method for manufacturing an active material composite powder according to claim 4, wherein the solution including lithium and a peroxo complex of niobium is produced by producing a transparent solution by combining hydrogen peroxide water, niobium acid, and ammonia water, and thereafter adding lithium salt to the transparent solution.

6. The method for manufacturing an active material composite powder according to claim 1, wherein the solution including lithium and a peroxo complex of niobium is produced by producing a transparent solution by combining hydrogen peroxide water, niobium acid, and ammonia water, and thereafter adding lithium salt to the transparent solution.

7. The method for manufacturing an active material composite powder according to claim 1, wherein the heat treatment is carried out at a different temperature than the drying.

8. The method for manufacturing an active material composite powder according to claim 1, wherein the mixing and stirring are carried out in an environment at 20° C. to 60° C.

9. The method for manufacturing an active material composite powder according to claim 1, wherein a temperature of the powder is maintained below 300° C. throughout manufacturing, where maintaining the temperature of the powder less than 300° C. reduces a reaction resistance of a battery by reducing a number of gaps in the coating layer and preventing crystallization of the lithium niobate.

10. The method for manufacturing an active material composite powder according to claim 1, wherein a temperature of the powder does not exceed 300° C. during manufacturing.

11. A method for manufacturing an active material composite powder, the method comprising:
spraying a solution including lithium and a peroxo complex of niobium over an active material, and at the same time drying the solution, wherein the peroxo complex comprises at least hydrogen peroxide and niobium;
after the spraying and drying, carrying out a heat treatment for obtaining a powder including the active material and a coating layer attached to a surface of the active material,
wherein the coating layer comprises lithium nitrate and lithium niobate,
wherein a temperature of the heating treatment is higher than 123° C. and no more than 250° C.;
after the heat treatment, mixing the powder and a solvent such that the solvent dissolves lithium nitrate from the coating layer and does not dissolve lithium niobate included in the coating layer obtained by the heat treatment to produce a mixed liquid, and stirring the mixed liquid;
after the mixing and stirring, carrying out a solid-liquid separation on the mixed liquid; and
drying a solid obtained by the solid-liquid separation, wherein a BET surface area of the active material composite powder is more than 0.93 $m^2/g$ and less than 1.44 $m^2/g$.

12. The method for manufacturing an active material composite powder according to claim 11, wherein the solution including lithium and a peroxo complex of niobium is produced by producing a transparent solution by combining hydrogen peroxide water, niobium acid, and ammonia water, and thereafter adding lithium salt to the transparent solution.

13. The method for manufacturing an active material composite powder according to claim 11, wherein the solvent is ethanol.

* * * * *

UNITED STATES PATENT AND TRADEMARK OFFICE
CERTIFICATE OF CORRECTION

PATENT NO. : 10,868,292 B2
APPLICATION NO. : 15/261110
DATED : December 15, 2020
INVENTOR(S) : Takayuki Uchiyama It is certified that error appears in the above-identified patent and that said Letters Patent is hereby corrected as shown below:

On the Title Page

Item (71), applicant 1, city, delete "Toyota" and insert --Toyota-shi Aichi-ken--, therefor.

Item (72), inventor 1, city, delete "Susono" and insert --Susono-shi, Shizuoka-ken--, therefor.

Item (73), assignee, city, delete "Toyota" and insert --Toyota-shi Aichi-ken--, therefor.

In the Specification

In Column 11, Line(s) 31, delete "$Nb_2O_5\text{-}3H_2O$" and insert --$Nb_2O_5 \cdot 3H_2O$--, therefor.

In Column 11, Line(s) 33, after "mass", insert --%--.

In Column 11, Line(s) 37, delete "$LiOH\text{-}H_2O$" and insert --$LiOH \cdot H_2O$--, therefor.

In Column 13, Line(s) 64, delete "$LiNi_{1/3}Co_{1/3}O_2$" and insert --$LiNi_{1/3}Mn_{1/3}Co_{1/3}O_2$--, therefor.

Signed and Sealed this
Thirtieth Day of March, 2021

Drew Hirshfeld
*Performing the Functions and Duties of the*
*Under Secretary of Commerce for Intellectual Property and*
*Director of the United States Patent and Trademark Office*